Aug. 18, 1942.  E. J. MARTIN ET AL  2,293,349
OSCILLOGRAPH
Filed Dec. 22, 1939  9 Sheets-Sheet 1

Inventors
Edward J. Martin,
Darl F. Caris &
Robert N. Frawley
By Blackmore, Spencer & Flint  Attorneys

Aug. 18, 1942.   E. J. MARTIN ET AL   2,293,349
OSCILLOGRAPH
Filed Dec. 22, 1939        9 Sheets-Sheet 4

Inventors
Edward J. Martin,
Darl F. Catis &
Robert N. Frawley

Aug. 18, 1942.  E. J. MARTIN ET AL  2,293,349
OSCILLOGRAPH
Filed Dec. 22, 1939  9 Sheets-Sheet 5

Inventors
Edward J. Martin,
Darl F. Catis &
Robert N. Frawley
By Blackmore, Spencer & Hine Attorneys Aug. 18, 1942.  E. J. MARTIN ET AL  2,293,349
OSCILLOGRAPH
Filed Dec. 22, 1939  9 Sheets-Sheet 6

Inventors
Edward J. Martin,
Darl F. Caris &
Robert N. Frawley
By Blackmore, Spencer & Flint
Attorneys Aug. 18, 1942.  E. J. MARTIN ET AL  2,293,349
OSCILLOGRAPH
Filed Dec. 22, 1939  9 Sheets-Sheet 7

Inventors
Edward J. Martin,
Darl F. Caris &
Robert N. Frawley
By Blackmore, Spencer & Hind Attorneys Aug. 18, 1942.　　　E. J. MARTIN ET AL　　　2,293,349
OSCILLOGRAPH
Filed Dec. 22, 1939　　　9 Sheets-Sheet 8

Inventors
Edward J. Martin,
Dail F. Caris &
Robert N. Frawley
By Blackmore, Spencer & Flint Attorneys Aug. 18, 1942.  E. J. MARTIN ET AL  2,293,349
OSCILLOGRAPH
Filed Dec. 22, 1939   9 Sheets-Sheet 9

Inventors
Edward J. Martin,
Darl F. Caris &
Robert N. Hawley
By Blackmore, Spencer & Hick Attorneys Patented Aug. 18, 1942

2,293,349

UNITED STATES PATENT OFFICE 2,293,349

OSCILLOGRAPH

Edward John Martin, Huntington Woods, Darl F. Caris, Dearborn, and Robert N. Frawley, Detroit, Mich., assignors to General Motors Corporation, Detroit, Mich., a corporation of Delaware Application December 22, 1939, Serial No. 310,660

10 Claims. (Cl. 234—61)

The present invention relates to improvements in an oscillograph and more particularly to improvements in the optical system whereby high speed and high frequency events may be simultaneously viewed and photographed by means of the light from an incandescent light source.

Among the objects attained in the present invention are the following:

A rotatable optical system in combination with an incandescent light source requiring a minimum of adjustable elements by which an inexperienced operator may simultaneously view and photographically record high frequency oscillations with respect to a uniform time axis;

A rotatable optical system of such design that the light from a relatively long incandescent filament is concentrated in the form of an essentially square spot of light on a film and/or screen so as to make the use of an arc light unnecessary;

An improved driving means whereby the phase relation between the driving and driven shafts of the rotatable optical system may be conveniently changed without interruption of the drive therebetween.

The structures whereby the above and associated objects are attained are described in the following specification and illustrated in the following drawings, in which.

Figure 1:
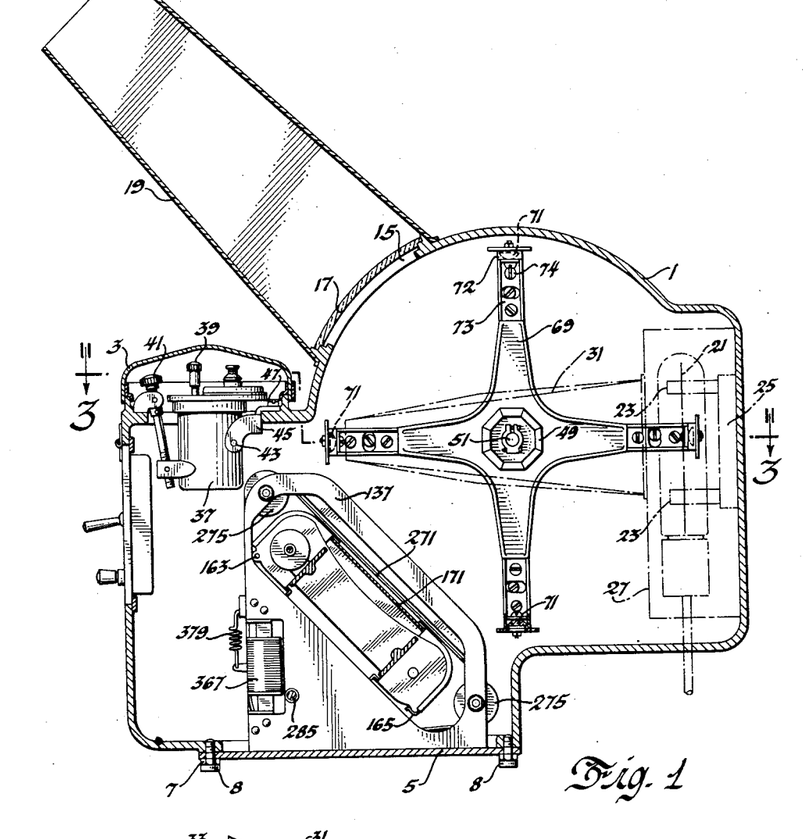
Figure 1 is a vertical longitudinal section through the oscillograph housing.
Figure 3:
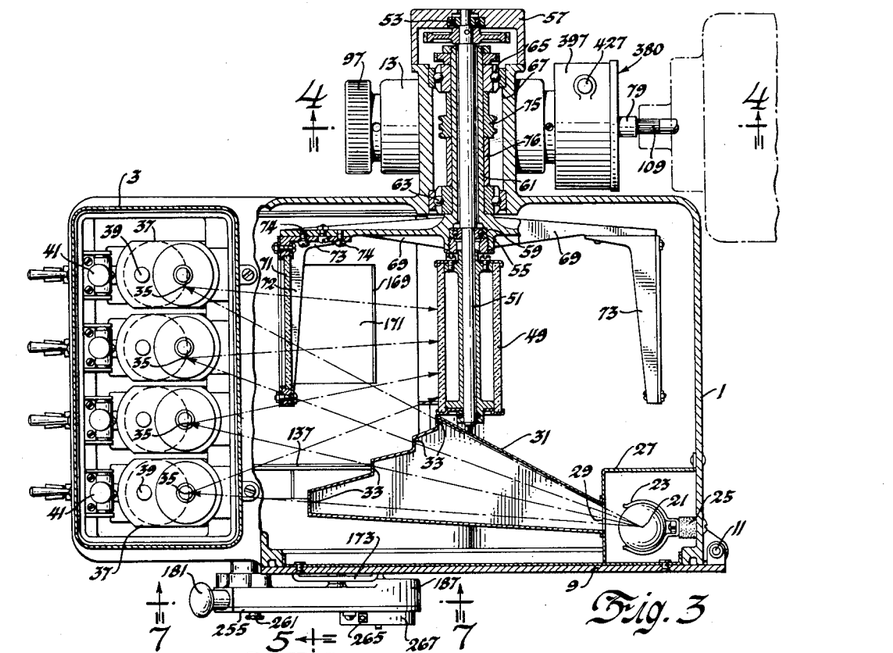
Figure 3 is a horizontal longitudinal sectional view taken on line 3—3 of Figure 1.
Figure 4:
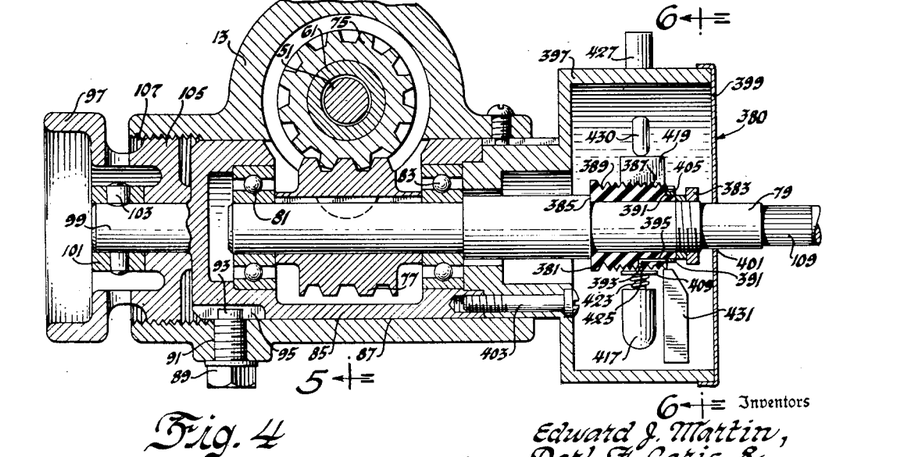
Figure 4 is a vertical enlarged sectional view taken on line 4—4 of Figure 3 showing details of the phase changing mechanism included in the driving mechanism and details of the automatic shutter switch.
Figure 5:
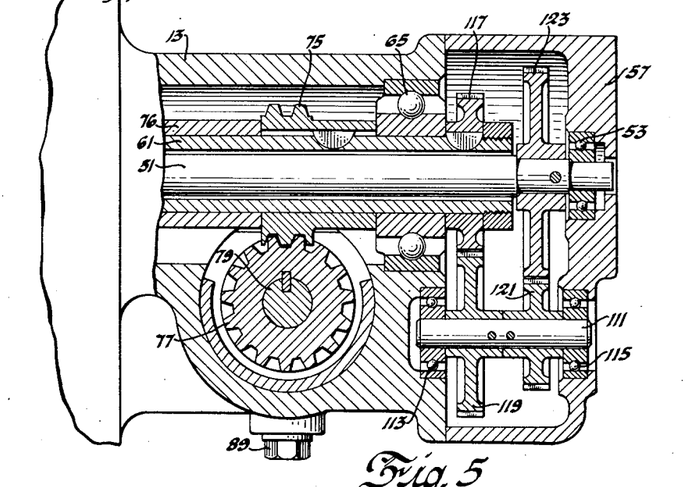
Figure 5 is a vertical sectional view taken on line 5—5 of Figure 4.
Figure 6:
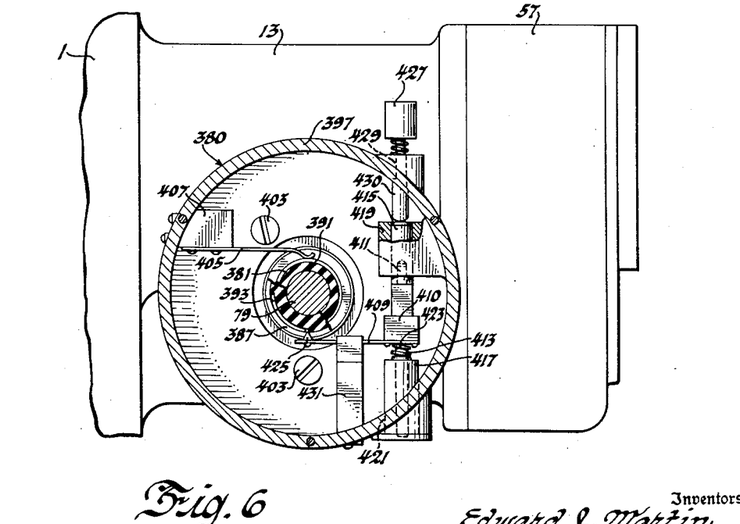
Figure 6 is a vertical sectional view taken on line 6—6 of Figure 4 showing details of the automatic shutter switch.

Referring to Figures 1 and 3, 1 is a housing supporting and enclosing all of the apparatus constituting the oscillograph unit. The housing 1 has a removable top cover 3, a bottom plate 5 attached thereto by cap screws 7, the heads of which are provided with resilient caps 8 acting as feet, and a door 9 hinged thereto at 11 provides access to the interior of the housing from one side. The housing 1 has an integral projection 13 on the side opposite the door 9 in which the rotatable driving and driven elements to be subsequently described are supported. An aperture 15 near the top of the housing is closed by a translucent viewing screen 17 and a removable viewing hood 19 is supported on the projecting edges of this aperture.

Figure 2:
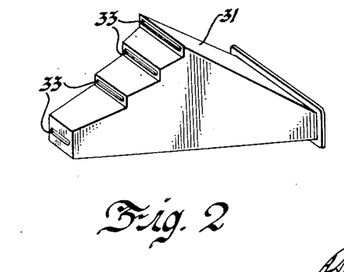
Figure 2 is a perspective view of a light shield shown in dotted lines in Figure 1.
Figure 19:
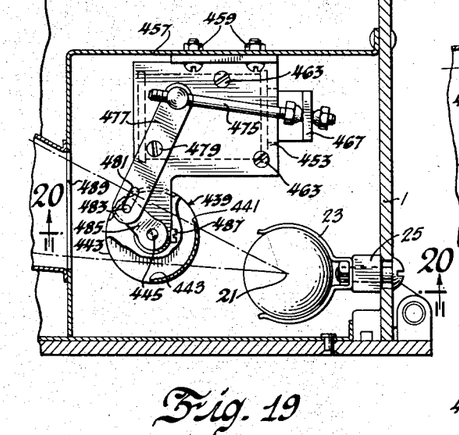
Figure 19 is a partial cross sectional view, somewhat like Figure 3, taken approximately on line 3—3 of Figure 1, but showing an improved shutter mechanism.

Within the housing is located optical and photographic apparatus and a light source indicated at 21 comprising a line filament incandescent bulb shown supported vertically in the housing 1 by means of support clips 23 and a support block 25. The clips, block and the housing are provided with openings through which bolts are inserted, as best shown in Figure 19, the openings and bolts being of such size to allow the clips and blocks to be adjusted so that the filament of the tube 21 may be located vertically in the housing and clamped in this position by the clamping nuts shown on the bolts. A lightproof shield 27 surrounds the light source and is provided with an aperture 29 for light emission therethrough. The shield 27 is fixed to the housing 1 and has a hollow shield 31, as best shown in Figure 2, fixed thereto and provided with a plurality of narrow vertical apertures 33 which allow the image of the entire incandescent filament to be projected on each of a number of small galvanometer mirrors indicated at 35 and to prevent leakage of light within the housing. The galvanometer mirrors are supported vertically for oscillation about an axis parallel to the filament axis of the light source on conventional galvanometer elements, not shown, which are likewise oscillatable about a vertical axis. The elements are enclosed in separate housings 37 located beneath the removable top cover plate 3, each of which has a window, not shown, through which light rays from the light source may enter, strike the mirror and be reflected outwardly therefrom. The galvanometer elements and adjustable mountings are of a well-known type, each having the usual adjusting means 39 to rotate the element about a vertical axis with respect to the housing 37 and adjusting screws 41 which rotate the housing 37 about a horizontal axis by means of pivots 43 integral with the housing and rotatably supported in brackets 45 fixed to the housing at 47.

An optical system rotatable about a common axis at right angles to the axis of oscillation of each of the galvanometer mirrors provides means for simultaneously viewing and photographically recording the oscillations of the mirrors with reference to a uniform time axis at right angles to the axis of oscillation of each mirror. The rotatable optical system comprises an octagonal mirror 49 adjustably fixed to a horizontal transverse shaft 51 rotatably supported in bearings 53 and 55 carried respectively in a cap member 57 fixed to the housing 1 and in a concentric recess 59 of a hollow shaft 61 surrounding the shaft 51. The hollow shaft 61 is rotatably supported in bearings 63 and 65 carried in a horizontal transverse bore 67 in the housing projection 13, the outer end of which is closed by the cap member 57. The hollow shaft 61 has four integral radially extending arms 69 spaced 90° apart. Four cylindrical lenses 71 are fixed in apertured frame members 72 having right angle extensions 73 which may be adjusted radially with respect to the ends of the radial arms 69 and clamped thereto by screws 74. By this means the lenses are supported with their longitudinal axes parallel to the axis of the octagonal mirror 49 and are capable of rotation around the axis thereof.

The lenses are driven at twice the angular velocity to that of the octagonal mirror and in the same direction by driving means shown in Figures 3 to 6. On the hollow shaft 61 supporting the lenses 71 a spiral gear 75 is fixed intermediate the support bearings 63 and 65. The gear 75 is prevented from moving axially on the shaft by a sleeve 76 carried on the shaft between the spiral gear and the bearing 63. The spiral gear 75 meshes with a spiral gear 77 fixed to a driving shaft 79 located below and rotatably supported at right angles with respect to the hollow shaft 61 by means of bearings 81 and 83 located on either side of the gear 77. The bearings 81 and 83 are carried in recesses in a cage member 85 which is axially movable in a horizontal bore 87 in the housing projection 13. A set screw 89 threaded in an opening 91 of the housing projection 13 has an end portion 93 extending into a keyway 95 in the cage 85 to prevent rotation thereof. The cage 85, gear 77 and driving shaft 79 are capable of being moved axially as a unit with respect to the bore 87 by a hand wheel 97 rotatably supported on a shank portion 99 of reduced diameter integral with the cage 85. The wheel 97 is prevented from moving axially on the shank by a collar 101 fixed thereon by a pin 103. The hand wheel has an externally threaded portion 105 carried in an internally threaded portion 107 of the bore 87 and when rotated moves the cage 85, gear 77 and shaft 79 axially in the bore 87 at right angles to the gear 75. The gear 77 accordingly acts as a rack and causes the gear 75 to rotate which changes the phase relation between the hollow shaft 61 and the driving shaft 79. The driving shaft 79 is provided with a splined portion 109 to allow for this axial movement with respect to a driving member which will be referred to later. A rotary shutter control mechanism indicated at 380 is also movable axially with the cage and shaft and will be described later. The shaft 51 on which the octagonal mirror is attached is driven by means of a parallel countershaft 111 supported in bearings 113 and 115 located respectively in the housing projection 13 and in the cap member 57. A gear 117 fixed to the hollow shaft 61 meshes with a gear 119 fixed on the countershaft and a gear 121 also fixed on the countershaft meshes with a gear 123 on the shaft 51. The total reduction between the gear 117 and the gear 123 is 1:2 so that the shaft 51 is driven at half the speed of the hollow shaft 61.

Figures 14, 15, 16:
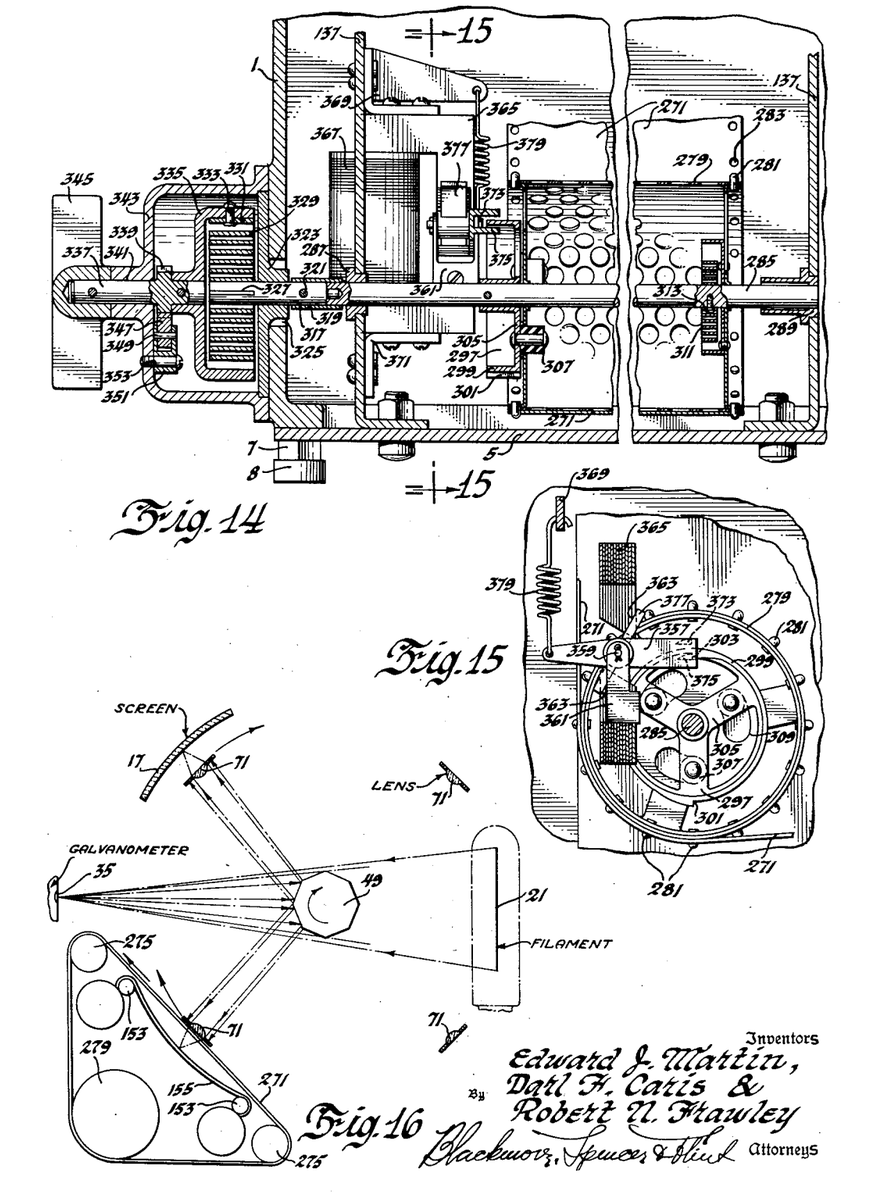
Figure 14 is a vertical sectional view taken on line 14—14 of Figure 7.
Figure 15 is a side elevation with parts showing in section along line 15—15 of Figure 14.
Figure 16 is a diagrammatic view showing the path taken by the light rays from the source to the various optical elements.

The relation of the rotatable optical system with respect to the light source and the galvanometer mirrors is best shown in Figure 16. All of these elements are arranged in a horizontal plane which includes the common axis of the rotatable system and extends through the center of the galvanometer mirrors 35 and the center of the filament 21, the axis of the filament being at right angles to the horizontal plane as is the axis of oscillation of each of the galvanometer mirrors. The common axis of the rotatable optical system is located between the light source and the galvanometer mirrors and at right angles thereto. With this arrangement each galvanometer mirror acts as a reflecting pinhole which intercepts the light rays emanating from the filament and reflects the inverted image of the filament on adjacent faces of the octagonal mirror. The image of the lower half of the filament 21 falling on the reflecting face of the octagonal mirror above the horizontal plane is reflected upward in the form of a narrow band of rays, and the image of the upper half of the filament which is reflected off the reflecting face of the octagonal mirror located below the horizontal plane is reflected downwardly in the form of a narrow band of light rays. Rotation of the octagonal mirror clockwise as shown causes these narrow bands of light to rotate at twice the angular speed of the octagonal mirror. The cylindrical lenses which rotate at twice the angular speed of the octagonal mirror about the axis thereof are so phased that adjacent lenses of the lenses 71 always intercept and condense the narrow bands of light reflected from each of the adjacent faces of the octagonal mirror into two fine spots of light of square shape. One of these spots of light falls on and traverses the viewing screen in a clockwise direction parallel to the plane of the paper at twice the angular velocity of the octagonal mirror as shown in Figure 16 to give the time axis and if the galvanometer mirror 35 is simultaneously oscillated about its vertical axis the spot will oscillate transverse to the time axis. The other spot of light simultaneously falls on and traverses a light sensitive photographic recording means 155 in a clockwise direction and oscillates transverse to the traversing or time axis in the same manner so that the oscillations of any one or all of the galvanometer mirrors may be viewed and simultaneously recorded.

A belt shutter 271 is shown between the recording means 155 and one of the lenses. This shutter is movable substantially tangent to the path of rotation of the lenses and has a plurality of apertures which open for a period of time sufficient to allow the light spot to traverse the recording means just once as will be described later. It will be obvious that a polygonal mirror of other than one having eight sides may be used, the number of lenses rotating thereabout being half the number of the faces of the polygonal mirror.

Figure 17:
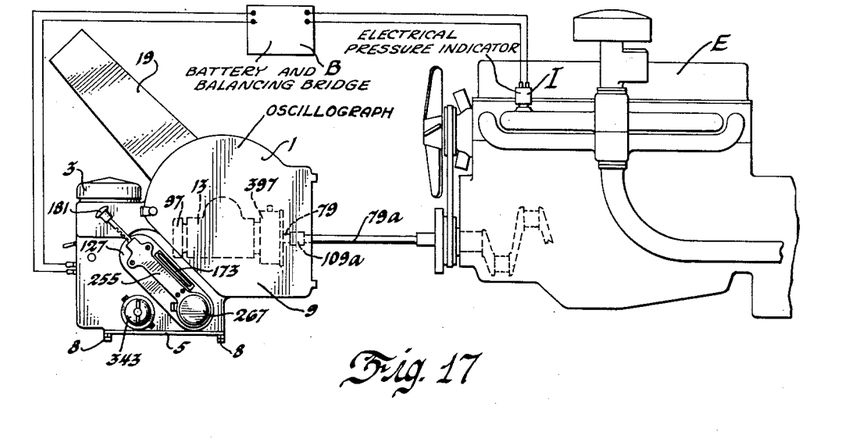
Figure 17 is a diagrammatic view showing the oscillograph driven directly from an internal combustion engine and the electrical circuits used for viewing and recording instantaneous variations of pressure within the engine.

The optical system may be driven at constant speed by separate driving means to provide the uniform time axis or may be directly driven by the machine on which measurements are being taken such as for example an internal combustion engine E, shown in Figure 17. The internal combustion engine E is shown directly connected to the driving shaft 79 by a shaft 79a having an internal splined coupling 109a fitting over the spline 109 of the driving shaft 79. An electrical indicator I is shown measuring the instantaneous variations in the intake pipe of the engine. These variations in pressure cause variations of the resistance through the indicator I which causes variations in the current flow through the electrical indicator. The current supplied to the indicator is supplied by any suitable source, not shown, contained in a box B in which is also located a balancing bridge, not shown. The indicator, source and bridge are electrically connected to one of the oscillograph elements which is oscillated by the variations in current flow therethrough. The amplitude of this oscillation may be calibrated directly in pressure units. The current variations in any circuit may be calibrated, viewed and recorded in a similar manner. The indicator shown is one example of means whereby current variations proportional to pressure are produced.

Figure 7:
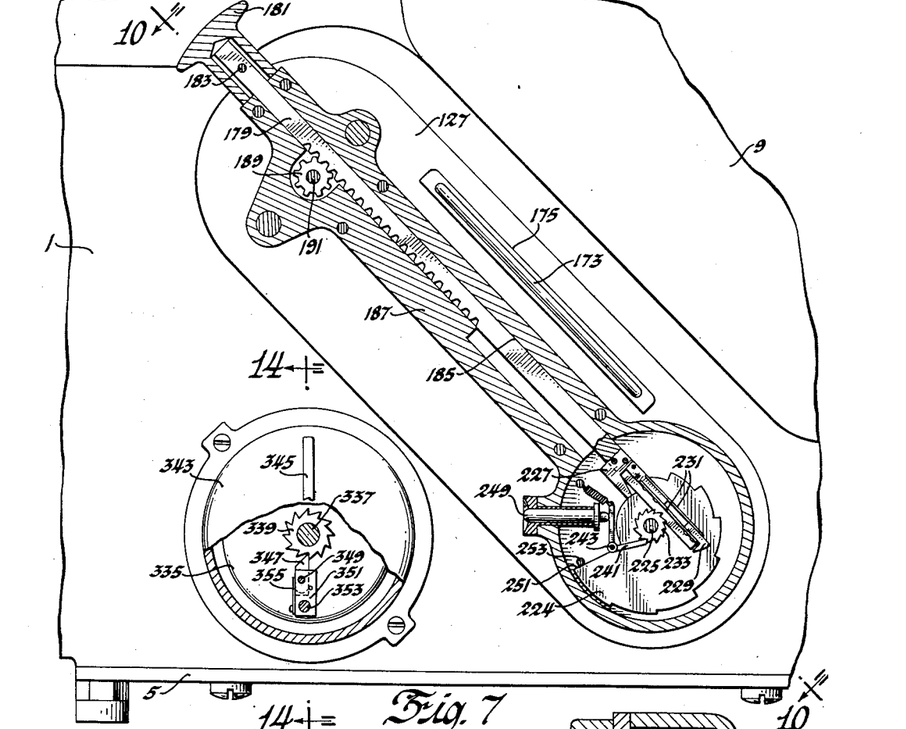
Figure 7 is a vertical sectional view taken on line 7—7 of Figure 3 showing details of the film housing, film indexing mechanism, the exposure counter associated therewith, and the winding mechanism of the focal plane shutter having part of the housing broken away to show details thereof.
Figure 10:
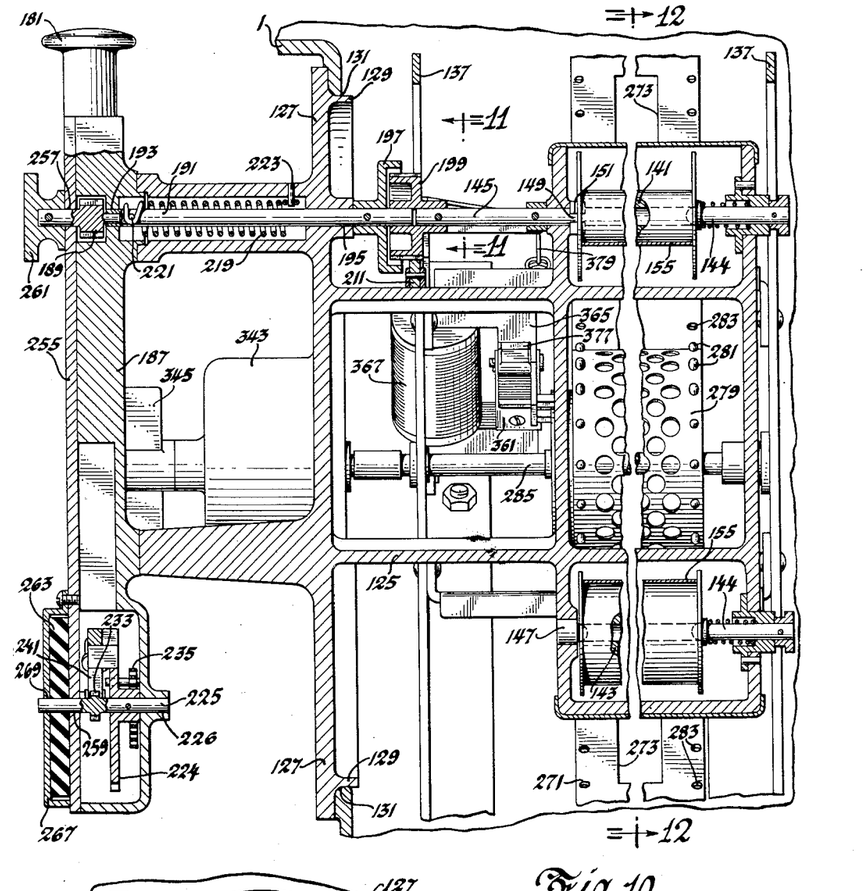
Figure 10 is a sectional view taken on line 10—10 of Figure 7.

The photographic recording means comprising a removable film housing complete with a film winding mechanism and exposure counter supported in a frame 125, shown best in Figures 10, 12 and 13, having an external vertical flange 127 (see Figure 7), and a horizontal lip portion 129 which is slidable into an aperture 131 in the side of the housing 1 below the door 9 as shown in Figures 7, 10 and 17. The frame 125 is provided with transverse grooves 132 slidably mounted on flanged brackets 133 attached by screws 135 between two vertical side plates 137 spaced apart transversely which are bolted to the bottom cover plate 5. The plates 137 have apertures 139 for the reception of the removable frame 125. Standard sized film winding spools 141 and 143 are removably supported for rotation at one end on spring biased axially movable pivots 144 carried in the frame 125. The opposite ends of the spools are supported on stub shafts 145 and 147. The stub shaft 145 is rotatably mounted in the frame 125 and serves as a winding shaft being provided with a tongue 149 which fits into a groove 151 of the spool 141 on which the exposed film is to be wound. The stub shaft 147 is fixed to the frame 125. Rollers 153 are pivoted to the frame 125 adjacent the spools 141 and 143 to support the light sensitive means or film 155 for passage over an arcuate frame surface 157 having a radius equal to the radial distance to the common axis of revolution of the rotatable optical system. The film 155 is also guided on and off the arcuate surface by transverse guides 159 fixed to a film housing cover 161 which is pivoted at 163 to the frame and having a bent end portion 165 which may be snapped over and thus locked in a closed position to the transverse ledge 167 of the frame. The cover prevents exposure of the film and has an aperture 169 normally closed by a lightproof slide 171 having a projecting handle 173 so that this slide may be removed from between the cover 161 and the transverse guides 159 when making an exposure. This slide is removable from the housing 1 through an aperture 175. The film 155 is made to lie flat on the arcuate surface 157 by arcuate guides 177 extending slightly over the sides thereof.

Figure 8:
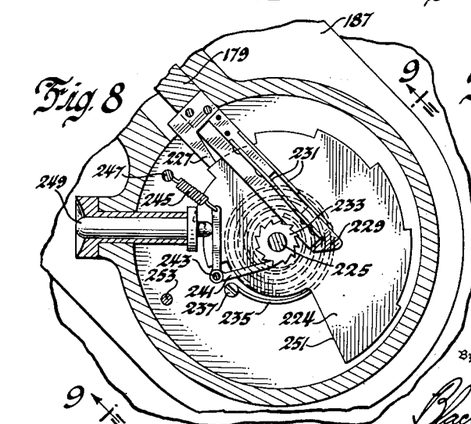
Figure 8 is an enlarged view of a portion of Figure 7.
Figure 9:
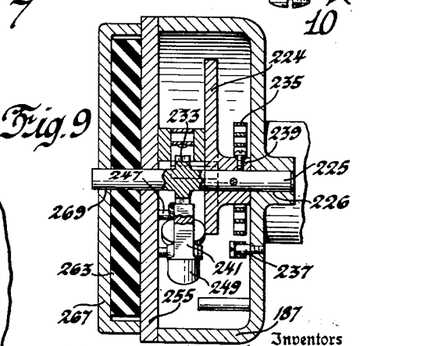
Figure 9 is a side elevation with some of the parts shown in section taken on line 9—9 of Figure 8 and other parts broken away to show details thereof.
Figure 11:
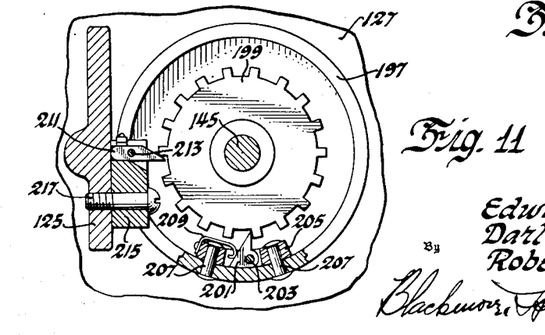
Figure 11 is an enlarged sectional view taken on line 11—11 of Figure 10 with some of the parts shown in section.

In order to obtain a constant length of film for each exposure for an increasing radius of the winding spool as more layers of film are wound thereon, the following indexing mechanism is provided. This mechanism is shown in Figures 7 to 11 and includes a rack 179 having a button 181 fixed to the upper end thereof by a pin 183 by which it is moved downwardly in a slot 185 in a housing member 187 fixed to the frame 125. The rack meshes with a pinion 189 fixed to a shaft 191 rotatably supported in openings 193 and 195 drilled respectively in the housing 187 and frame 125 in axial alignment with the stub winding shaft 145. An annularly flanged driving disc 197 is fixed to the inner end of the shaft 191 and the flange is in concentric relation to a toothed wheel 199 fixed on the stub shaft 145. As shown in Figure 11, a pawl 201 is pivoted at 203 to a member 205 which is fixed to the inner periphery of the flanged disc 197 by means of the rivets 207. The pawl is held in engagement with the teeth of the wheel 199 by a spring 209 fixed to the member 205 so that the wheel 199 will be rotated counterclockwise by the driving disc 197 when the rack is thrust downward but allows relative rotation of the disc 197 in the opposite direction with respect to the wheel as viewed in Figure 11. A spring pressed pawl 211 is pivoted at 213 on a member 215 fixed by means of a screw 217 to the frame 125 to engage the teeth of the wheel 199 to allow rotation thereof in the counterclockwise direction but prevent rotation in the opposite direction. A helical spring 219 surrounds the shaft 191 and has one end hooked over a pin 221 fixed to the shaft and the other end hooked over a pin 223 fixed in the frame and is torsionally stressed when the shaft 191 is rotated by downward movement of the rack 179. This spring tends to rotate the shaft and pinion in the opposite direction and thereby move the rack upward to its normal or extended position when downward pressure is released from the button 181 on the rack. Downward movement of the rack is limited by means of a cam 224 fixed to a shaft 225 which is rotatably supported in a drilled opening 226 in the housing 187. The shaft 225 is located slightly to one side of the axis of the rack as best shown in Figures 7 and 8. A finger 227 is fixed to the lower end of the rack and contacts the external periphery of the cam when moved to its fully depressed position to limit the movement thereof which likewise limits the rotary movement of the shaft 191 so that a constant length of film will be wound on the winding spool 141 regardless of the amount of film thereon. The peripheral surface of the cam comprises a plurality of lands, each of increasing radius and angularly spaced thereon which the finger 227 contacts successively. The cam is rotated by a pawl 229 supported by flexible members 231 attached to the end of the rack. The pawl engages a tooth of a ratchet 233 integral with the shaft 225 when the rack is fully depressed and when it is returned to its normal projected position the pawl rotates the ratchet, shaft and cam counterclockwise through an angle necessary to present the next successive cam-land of greater radius for contact by the finger 227 when the rack is next depressed. Counterclockwise rotation of the cam, as viewed in Figure 8, winds up a spiral spring 235, the outer end of which is fixed to the housing member 187 at 237 and the inner end is fixed to the cam at 239. A pawl 241 pivoted at 243 to the housing member 187 is constantly urged into contact with the teeth of the ratchet 233 by a spring 245 connected between one end of the pawl and a pin 247 carried by the cover plate 255 to prevent unwinding of the spring 235. The pawl 241 is manually releasable by a push button 249, the inner end of which is maintained in contact therewith to allow unwinding of the spring 235 which then rotates the cam clockwise so that a radial surface 251 of the cam strikes a stop pin 253, as shown in Figure 7.

As shown in Figure 10, the above apparatus is retained within the housing member 187 by a cover plate 255 having openings 257 and 259 acting as bearings through which the pinion shaft 191 and cam shaft 225 project. A knurled knob 261 is fixed to the outer end of the pinion shaft to allow the shaft to be turned by this means as well as by the rack. A disc 263 is fixed to the outer end of the camshaft which has numerals stenciled on the periphery therof. These numerals are angularly spaced circumferentially to correspond to the angular spacing of the cam-lands and are moved successively into register with an aperture 265 in a housing 267, as best shown in Figure 3, fixed to the cover plate 255 to indicate the number of exposures of the film. The housing 267 encloses the disc 263 and has an opening 269 for rotatably supporting the projecting end of the camshaft.

Figure 12:
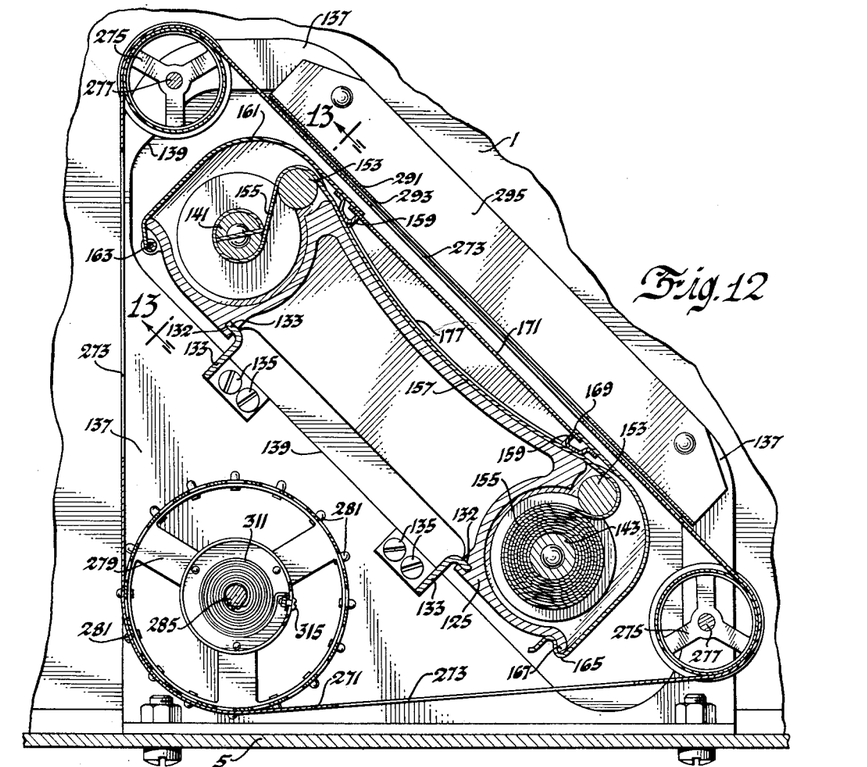
Figure 12 is a vertical sectional view taken on line 12—12 of Figure 10.
Figure 13:
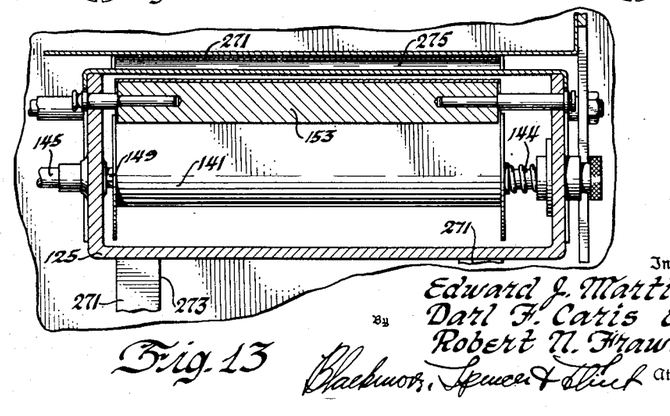
Figure 13 is a transverse sectional view taken on line 13—13 of Figure 12.

A focal-plane shutter mechanism is shown in Figures 10, 12, 14 and 15. This mechanism comprises an endless shutter belt 271 completely enclosing the film housing and provided with three equally spaced apertures 273 which may be moved into register with the aperture 169 in the cover 161 of the film housing to expose a given length of film upon removal of the lightproof slide 171. The belt is supported and guided by two flanged idler pulleys 275 rotatably supported on shafts 277 extending horizontally between the vertical support plates 137 and is likewise supported and driven by a driving pulley 279 provided with radially extending lugs 281 along the peripheral edges thereof which extend through holes 283 in the edge of the belt 271. The driving pulley 279 is rotatably supported on a horizontal shaft 285 which is rotatably supported in bushings 287 and 289 in the side plates 137. A plate 291 having an aperture 293 adjacent the aperture 169 in the film cover 161 is attached by angular side portions 295 between the vertical plates 137 to guide the belt 271 between the idler pulleys 275, as shown in Figure 12. The driving pulley 279 is rotated counterclockwise as viewed in Figure 12 and is stopped in definite angular positions by mechanism about to be described in order to bring the apertures 273 in the belt 271 into register with the apertures 169 in the cover 161 surrounding the film 155 and the aperture 293 in the belt guiding plate 291.

The driving and stopping mechanism for the driving pulley comprises the following apparatus: An escape wheel 297 is fixed to the shaft 285 adjacent one end of the driving pulley 279. This wheel has an annular rim portion 299 provided with an external stop lug 301 and an internal stop lug 303. These lugs are located diametrically opposite each other to limit rotary movement of the shaft 285 through an angle of 180°. The spokes 305 of the escape wheel have resilient buffers 307 attached thereto which extend horizontally through slotted openings 309 in the end of the driving pulley. A spiral spring 311 has its inner end 313 attached to the shaft 285 adjacent the opposite end of the pulley 279 and its outer end fixed to a cup member at 315 which is riveted to the end of the driving pulley. This spring 311 normally tends to rotate the driving pulley 279 clockwise with reference to the escape wheel 297 whereby the buffers 307 occupy the position with reference to the slotted openings 309 as shown in Figure 15. The shaft 285 is connected to a stub shaft 317 in axial alignment therewith by a sleeve 319 and a pin 321. The stub shaft 317 extends through a bearing member 323 adjacent an opening 325 in the housing 1 and has a slot 327 in the end thereof in which is attached the inner end of a spiral clock spring 329. The outer end 331 of the spring is fixed at 333 to the inner periphery of a drum 335 enclosing the spring 329 and the drum is fixed to a shaft 337 having a ratchet portion 339. The shaft 337 extends outward through a hole 341 of a housing member 343 which is fixed to the housing 1 and encloses the drum 335 and the bearing member 323. The protruding end of the shaft 337 has a winding key 345 attached thereto for tensioning the clock spring 329 to cause rotation of the shafts 317 and 285. A pawl 347 is pivoted at 349 on a member 351 attached at 353 within the housing 343. The pawl is held in engagement with the ratchet 339 by a leaf spring 355 to prevent unwinding of the spring 329 as best shown in Figures 7 and 14. The spring when wound is capable of rotating the shafts 317, 285, escape wheel 297 and driving drum 279 counterclockwise for a number of revolutions whereby a plurality of successive exposures may be made with one winding of the spring.

Rotation of the escape wheel in 180° increments is controlled by magnetically actuated mechanism shown in Figures 14 and 15. This mechanism consists of a pawl 357 fixed to a pivot shaft 359 rotatable in a supporting member 361 fixed to one of the poles 363 of a magnetizable yoke 365. An electromagnet winding 367 is supported on the yoke and the yoke is attached to one of the side plates 131 by an upper bracket 369 and a lower bracket 371. One end of the pawl 357 is provided with lugs 373 and 375 integral therewith and spaced apart vertically. Both of the lugs 373 and 375 extend horizontally and straddle the annular rim 299 of the escape wheel. An armature 377 fixed to the pivot shaft 359 is attracted to the poles 363 of the yoke when the winding 367 is energized which moves the pawl to the position shown in Figure 15. When the parts are in this position one of the apertures 273 of the belt 271 is in register with the aperture 169 of the film cover for exposure of the film 155. When the electromagnet is deenergized the pawl is rotated counterclockwise with respect to the support 361 by the action of a tension spring 379 connected between opposite ends of the pawl 357 and the upper yoke support bracket 369. Movement of the pawl in this direction by the spring 379 moves the lower pawl lug 375 out of contact with the internal stop lug 303 of the escape wheel and allows the upper pawl lug 373 to contact the outer periphery of the annular rim 299 of the escape wheel for engagement by the external stop lug 301 formed thereon and spaced 180° from the inner stop lug 320. The escape wheel is thus rotated through 180° in a counterclockwise direction by the clock spring 329. Rotation of the escape wheel acting through the buffers 307 causes the driving drum 279 and belt 271 to be accelerated in a direction to close the aperture 169 in the film cover. When the escape wheel is suddenly stopped the lost motion connection comprising the slotted openings and the buffers extending therein allows the driving drum to overrun the shaft on account of its inertia and the inertia of the belt and idle pulleys. When over-running occurs, the spiral spring 311 connected between the driving pulley and the shaft is wound up and thereby absorbs the greater part of the inertia of the moving parts, the remainder of this inertia being absorbed by the resilient buffers 307 when they are contacted by the edges of the slotted openings 309 of the driving pulley. When the pulley is stopped by the buffers, it is then rotated backward clockwise with reference to the shaft 285 to its normal position with respect to the escape wheel as shown in Figure 15 by the gradual unwinding of the spring 311. This combined lost motion and shock absorber connection comprises resilient buffers, and a spiral spring connected between the escape wheel and driving drum to absorb the inertia of the rapidly moving shutter belt and rotating parts on which it is supported when these parts are stopped. The rate of movement of these elements is great in order that the aperture 169 in the film housing be fully uncovered between the time one of the lenses 71 leaves the far side of the aperture 169 until the next adjacent lens approaches the near side of the aperture. As the belt 271 moves tangentially in the same direction to the path of movement of the lenses 71 at great velocity, the speed of the lenses may be varied to approach and exceed the velocity of the belt. Variation of the speed of the lenses varies the time axis which is advantageous in high speed and high frequency recording. The opening of the shutter is controlled by the electromagnet as explained above, the energization of which is controlled by a rotary shutter control mechanism referred to previously, and shown in Figures 4 and 6.

Figure 18:
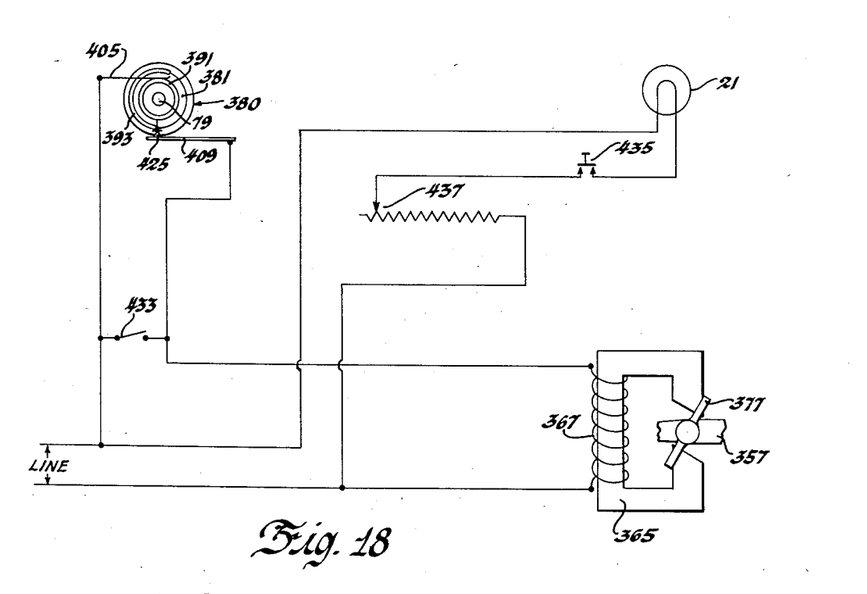
Figure 18 is a wiring diagram of the control apparatus for the light source and shutter mechanism.

A rotary shutter control mechanism indicated generally at 380 controls the opening and closing of the focal plane shutter. This mechanism consists of an insulated sleeve 381 carried on and angularly adjustable with respect to the driving shaft 79. A clamp nut 383 threaded on the shaft serves to clamp the sleeve between it and a shoulder 385 on the shaft in the angular position to cause the shutter to open slightly after one of the lenses 71 leaves the far side of the aperture 61 as explained above. The outer periphery of the sleeve is threaded at 387 from the outer end thereof to a circumferential groove 389 having greater depth than the threads and located adjacent the inner end of the sleeve. The sleeve is of reduced diameter adjacent the clamp nut and a slip ring 391 is pressed thereon. A contact wire 393 having one end, not shown, embedded in the bottom of the thread groove extends around the groove and has its other end extending outwardly through an axial hole 395 in the sleeve and is electrically connected to the slip ring. The sleeve is enclosed in a housing 397 having an end cover 399 provided with an opening 401 through which the splined end 109 of the driving shaft 79 projects. The housing is fixed to the cage member 85 by machine screws 403 and is movable with the cage, shaft, and sleeve as a unit when the hand wheel 97 is rotated as explained above. A contact spring 405 is fixed to an insulating block 407 attached within the housing and the outer end thereof bears on the slip ring 391. A contact arm 409 is fixed to a block 410 having an upper pivot 411 and a lower pivot 413 rotatably supported in insulating bushings 415 and 417 respectively. The upper bushing 415 is slidably mounted in the internal boss 419 of the housing and the lower bushing 417 is pressed in an opening 421 at the bottom of the housing. A helical tension and compression spring 423 is mounted on the lower pivot 413 between the lower bushing and the block. The upper end of the spring is fixed to the block and the lower end to the lower bushing and tends to both urge the block 410 and contact arm 409 upward so that a conical contact 425 attached to the end thereof is maintained in the thread groove of the sleeve and also tends to resist movement of the conical contact toward the circumferential groove 389 due to the lead of the threads and normal rotation of the sleeve 393 by the driving shaft 79. A push button 427 is slidably mounted in an opening 429 in axial alignment with pivots 411 and 413, the shank 430 of which is in contact with the slidable upper bushing 415 to move the bushing, block, arm and conical contact downward out of the threads 387 or the groove 389 of the sleeve so that these parts will be rotated by spring 423 about the axis of the pivots until the contact arm 409 strikes an insulated stop member 431 fixed to the housing adjacent the end of the sleeve 391. When downward pressure is relieved from the push button, the spring 423 moves the block and contact arm 409 upwardly, allowing the conical contact 425 to enter the threads near the outer end thereof for movement axially toward the circumferential groove 389 by normal rotation of the shaft. The conical contact when moving axially strikes the contact wire 393 and an electrical connection is established between the contact arm 409 and the contact spring 405 until the wire rotates out from under the conical contact point. The duration of this electrical connection depends upon the speed of rotation of the shaft 79 and the length of the contact wire 393. This rotary shutter control mechanism is included in a control circuit shown in Figure 18 and is connected in series across a line with the electromagnet winding 377 controlling the shutter tripping mechanism to obtain a single exposure. A manual shutter control switch 433 is connected to shunt across this rotary mechanism to operate the shutter tripping mechanism for making multiple exposures. The light source 21 is connected across the line with a control switch 435 and a rheostat 437 in series therewith for controlling the current through the filament to vary the amount of light emitted therefrom. With this arrangement it is only necessary to close the control switch 435 for illuminating the filament 21 and move the push button 427 downward and then release it to obtain a single exposure of the film 155. If a number of successive exposures is desired, the manual control switch 433 is held closed.

Figure 20:
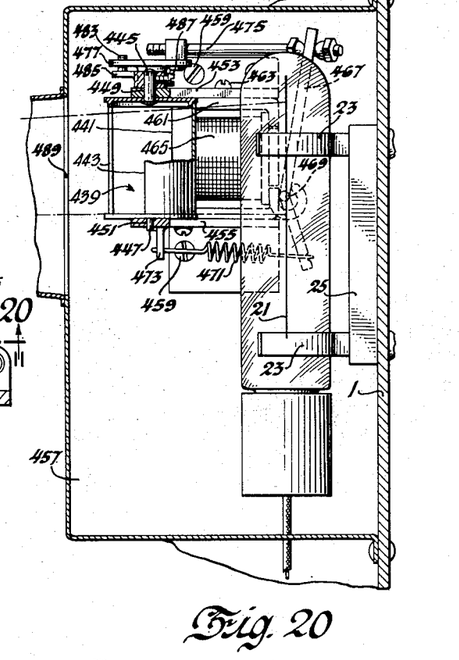
Figure 20 is a partial cross sectional view taken on line 20—20 of Figure 19.
Figure 21:
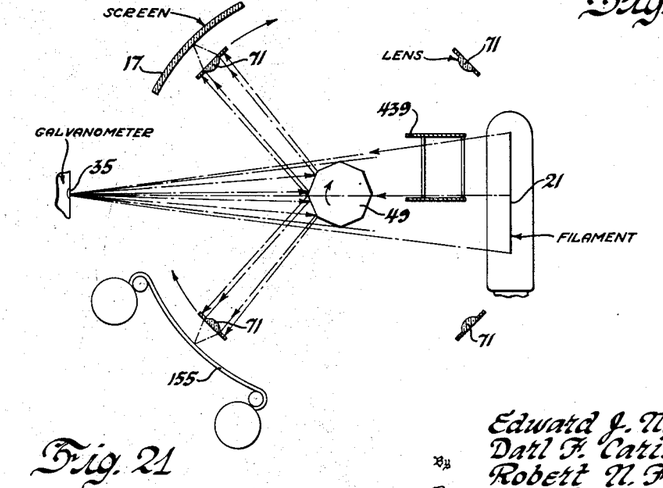
Figure 21 is a diagrammatic view similar to Figure 16 showing the path taken by the light rays through the simplified shutter mechanism shown in Figures 19 and 20.

In Figures 19 and 20 is shown a simplified shutter mechanism which may be substituted in place of the shutter mechanism described above and may be controlled by the above rotary shutter control mechanism 380. This simplified shutter comprises a hollow cylindrical shutter indicated at 439 having apertures 441 and 443 located diametrically opposite each other in the wall thereof. The shutter is mounted for rotation parallel to the upper half of the light source 21 by means of the pivot portions 445 and 447 carried in openings 449 and 451 respectively in an upper angle bracket member 453 and a lower angle bracket member 455. These brackets are fixed to the vertical wall of the shield member 457 by means of the bolts and nuts indicated at 459. A magnetizable yoke 461 is fixed by means of screws 463 between the upper and lower brackets 453 and 455 and carries an electromagnet winding 465 which when energized attracts an armature 467 pivoted at 469 to the yoke. A tension spring 471 fixed between the lower extremity of the armature and an extension 473 of the lower bracket 455 normally biases the armature 467 away from the yoke 461. When the armature is attracted to the yoke 461 by the electromagnet 465 a connecting rod 475 pivoted to the upper end of the armature and to one end of a lever 477, which is pivoted at 479 to the upper bracket, is rotated counterclockwise about the pivot point 479. The other end of the lever has a slot at 481 through which a pin 483 extends. The pin is fixed to a lever 485 which is fixed to the upper pivot 445 by a set screw 487 and causes rotation of the shutter through an angle so that the apertures 441 and 443 are aligned to allow light rays from the source 21 to pass therethrough and also pass outward through an aligned opening 489 in the shield 457 and fall on the galvanometer mirrors through openings, not shown, but like the openings 33 in the shield 31 shown in Figure 2. As explained previously, the light rays produced by the upper half of the light source 21 are reflected from the galvanometer mirrors 35 and fall on the lower reflecting face of the octagonal mirror 49 from which they are reflected to the film 155, as best shown in Figure 16, when the shutter is opened. When the shutter is closed no light therefore falls on the film. When the simplified shutter is being used the belt shutter 271 is removed and the electromagnet controlling it is disconnected. The electromagnet winding 465 is then wired in the circuit shown in Figure 17 in place of the winding 377 and is energized by the rotary switch 380 as explained above.

We claim:

1. In an oscillograph comprising a light source, a mirror oscillatable about an axis for reflecting the image of the light source, a polygonal mirror rotatable about an axis at right angles to the axis of oscillation of the first named mirror to receive the reflected image of said light source on adjacent faces thereof, a plurality of condensing lenses equally spaced angularly around and equidistant from the axis of said polygonal mirror, said lenses being rotatable as a unit around the axis of said polygonal mirror at twice the angular velocity thereof so that a lens of said lenses intercepts and condenses the light rays produced by substantially each half image of said light source reflected from each of the adjacent faces of said polygonal mirror into a fine spot of light, a viewing screen fixed concentric to said lenses on which one of said spots of light falls and light sensitive recording means fixed concentric with said lenses on which the other spot of light falls.

2. In an oscillograph comprising a line filament light source, means controlling the light from substantially half of said filament, a mirror oscillatable about an axis parallel to the axis of said filament to reflect the entire image thereof, a polygonal mirror rotatable about an axis at right angles to said filament and receiving the entire reflected image thereof on adjacent faces thereof and a plurality of condensing lenses equally spaced angularly around said polygonal mirror and rotatable as a unit at twice the angular velocity thereof in concentric relation to the axis of said polygonal mirror so that a separate lens of said lenses always intercepts substantially each half image of the filament reflected from the adjacent faces of said polygonal mirror and condenses substantially each half image into a fine spot of light, a viewing screen fixed in concentric relation with respect to the path of movement of said lenses to receive one of said spots of light and a light sensitive photographic means fixed concentric with the path of movement of said lenses and angularly spaced with respect to said viewing screen to receive said other spot of light.

3. In an oscillograph comprising a line filament light source, a mirror oscillatable about an axis parallel to said filament for reflecting the image thereof, an optical system rotatable about a common axis at right angles to said filament comprising a polygonal mirror for receiving the reflected image of said filament on adjacent faces thereof and a plurality of condensing lenses equally spaced angularly around said polygonal mirror and rotatable as a unit at twice the angular velocity thereof in concentric relation therewith so that a lens of said lenses always intercepts and condenses each narrow light band produced by substantially half of the image reflected from each of the adjacent faces of said polygonal mirror into a fine spot of light, a stationary viewing screen and a stationary light sensitive recording means, said screen and said recording means being arranged concentric to said lenses to receive simultaneously a separate spot of light from said lenses.

4. In an oscillograph comprising a light source, a plane mirror oscillatable about an axis for reflecting the image of the light source, an optical system rotatable about a common axis at right angles to the axis of oscillation of said plane mirror comprising a polygonal mirror for receiving the reflected image of said light source on adjacent faces thereof and means operatively connected to said polygonal mirror for rotation at twice the angular velocity thereof, said means including a plurality of cylindrical condensing lenses equally spaced angularly about and concentric to the common axis so that each lens of any pair of lenses intercepts and condenses substantially one half of the image of said light source reflected from each of the adjacent faces of said polygonal mirror into a fine spot of light, driving means for said optical system, said means being axially movable along its axis to change the phase relation between said optical system and the driving means, a viewing screen, a light sensitive recording means, said viewing screen and said recording means being fixed concentric with respect to said lenses for receiving simultaneously one of said fine spots of light, a movable shutter normally cutting off substantially half the light from said filament to prevent exposure of said recording means, and means operably connected to said driving means for controlling movement of said shutter to the open position to allow exposure of said light sensitive means only while light is condensed thereon by one lens.

5. In an oscillograph comprising a line filament light source, a mirror oscillatable about an axis parallel to said filament, a polygonal mirror rotatable about an axis at right angles to said filament, a plurality of condensing lenses equally spaced around said polygonal mirror and rotatable as a unit about the axis thereof in the same direction at twice the angular velocity thereof, a viewing screen fixed adjacent the path of movement of said lenses, light sensitive means angularly displaced with respect to said screen and fixed adjacent said path of movement of said lenses, means for controlling exposure of said light sensitive means, said screen and said light sensitive means each receiving a spot of light condensed by different lenses each of which intercepts substantially half the image of said filament reflected off adjacent faces of said polygonal mirror, said adjacent faces receiving the entire image of said filament reflected from said oscillatable mirror.

6. In an oscillograph comprising an incandescent line filament light source, a mirror oscillatable about an axis parallel to said filament, a polygonal mirror rotatable about an axis at right angles to said filament, a plurality of cylindrical condensing lenses equally spaced around said polygonal mirror and rotatable as a unit about the axis thereof at twice the angular speed in the same direction with respect thereto, a viewing screen fixed adjacent the path of rotation of said lenses, light sensitive recording means fixed adjacent the path of rotation of said lenses and displaced angularly with respect to said screen, means between said lenses and said recording means movable tangentially with respect to said lenses to control exposure of said light sensitive means, said first named mirror reflecting the image of said incandenscent filament on adjacent faces of said polygonal mirror, said adjacent faces of said polygonal mirror reflecting substantially each half of said image, separate lenses of said lenses intercepting substantially each half image reflected from each face and condensing substantially said half images into two fine spots of light, one of which falls upon said viewing screen and the other falls upon said light sensitive means.

7. In an oscillograph comprising a line filament source of light, a mirror oscillatable about an axis parallel to said filament, a polygonal mirror rotatable about an axis at right angles to said filament, a plurality of cylindrical lenses equally spaced around said polygonal mirror and rotatable as a unit about the axis thereof in the same direction at twice the angular velocity of the said polygonal mirror, a viewing screen fixed adjacent the path of rotation of said lenses, photographic means displaced angularly with respect to said screen and fixed adjacent the path of movement of said lenses and means operable to cut off half of the effective light from said filament or operable to allow light from the entire filament to fall on said oscillatable mirror, so that when light from the entire filament falls on said oscillatable mirror the entire image of said filament is reflected therefrom onto adjacent faces of said polygonal mirror, substantially half of the image reflected from each face of the polygonal mirror being intercepted and condensed by different ones of said lenses to form two spots of light, one of which strikes the viewing screen and the other of which strikes the photographic means, the spot of light falling on said photographic means being produced by the part of said filament controlled by the means operable to cut off or allow light from substantially half of said filament to fall on said oscillatable mirror.

8. In an oscillograph comprising a source of light, means controlling the passage of said light from half of said source, a mirror oscillatable about an axis for reflecting the entire image of said source of light, a polygonal mirror mounted on an axis at right angles to the axis of oscillation of said oscillatable mirror to receive the entire reflected image of said source of light on adjacent reflecting faces thereof, cylindrical lenses having their longitudinal axes parallel to the axis of said polygonal mirror and equally spaced angularly around and concentric with said axis, means for rotating said polygonal mirror and said lenses about the axis of said polygonal mirror so that two of said lenses are always in an angular position to separately intercept and condense substantially half of the image of the source of light reflected from each of said adjacent faces into a fine spot of light, a viewing screen adjacent the path of rotation of said lenses for receiving one of said spots of light and photographic means angularly spaced with respect to said screen and fixed adjacent the path of movement of said lenses for receiving the other spot of light when said first mentioned means allows light to pass from said light source.

9. In an oscillograph comprising a line filament source of light, a plurality of mirrors capable of oscillation about individual axes parallel to said filament, a polygonal mirror rotatable about an axis at right angles to the filament for receiving images of said light source at axially spaced points along adjacent faces of said polygonal mirror reflected thereon from each of said first named mirrors, a plurality of cylindrical condensing lenses equally spaced angularly around and rotatable as a unit parallel with respect to the axis of said polygonal mirror and at twice the angular velocity of said polygonal mirror so that a lens of said lenses always intercepts and condenses the light produced by the reflection of substantially each of the half images from one of said adjacent faces of said polygonal mirror into fine spots of light, a viewing screen fixed adjacent the path of rotation of said lens to receive said spots of light, another lens of said lenses always intercepting the light produced by the reflection of substantially the other half of each of the images from the other of said adjacent faces of said polygonal mirror into fine spots of light, light sensitive photographic means fixed adjacent the path of rotation of said other lens to receive said spots of light, and means operable for allowing or preventing exposure of said light sensitive photographic means.

10. In an oscillograph comprising a line filament light source, a plurality of mirrors oscillatable about axes parallel to the filament of said light source, each of said mirrors arranged to reflect the entire image of said filament, a polygonal mirror rotatable about an axis at right angles to the axes of said first named mirrors and arranged with respect to said mirrors to receive the images reflected therefrom at spaced points on adjacent faces of said polygonal mirror, means for rotating the polygonal mirror, a plurality of cylindrical lenses equally spaced angularly about and concentric to the axis of said polygonal mirror and operatively connected thereto for rotation at twice the angular speed of the polygonal mirror so that one lens of said lenses intercepts and condenses each of the approximate half images of the filament reflected from each of the adjacent faces of the polygonal mirror into fine spots of light, a viewing screen, light sensitive means, said screen and light sensitive means being fixed at angularly spaced points concentric with respect to the path of movement of said lenses so that the light condensed by a pair of lenses traverses the screen and light sensitive means simultaneously, a shutter for intercepting the light from substantially half of said filament to prevent exposure of said light sensitive means, and adjustable phase shifting means driven in timed relation with said polygonal mirror and said lenses for controlling opening of the shutter only during the time the light spots traverse said light sensitive means.

EDWARD JOHN MARTIN.
DARL F. CARIS.
ROBT. N. FRAWLEY.